May 14, 1963 H. E. VERMILLION ET AL 3,089,539
METHOD AND FUEL FOR OPERATING COMBUSTION EQUIPMENT
Filed June 27, 1955 2 Sheets-Sheet 1

May 14, 1963 H. E. VERMILLION ET AL 3,089,539
METHOD AND FUEL FOR OPERATING COMBUSTION EQUIPMENT
Filed June 27, 1955 2 Sheets-Sheet 2
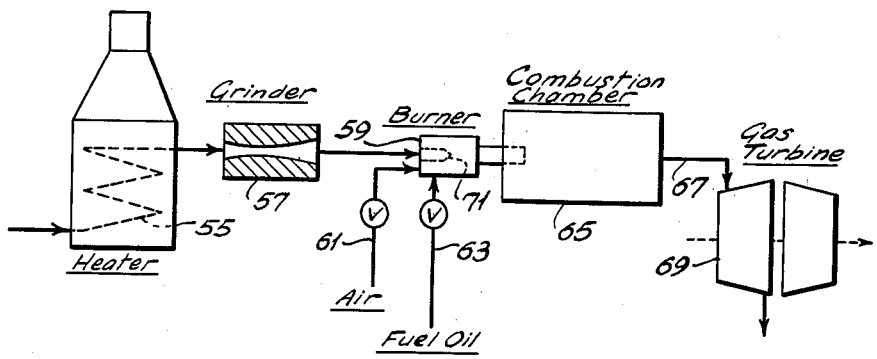
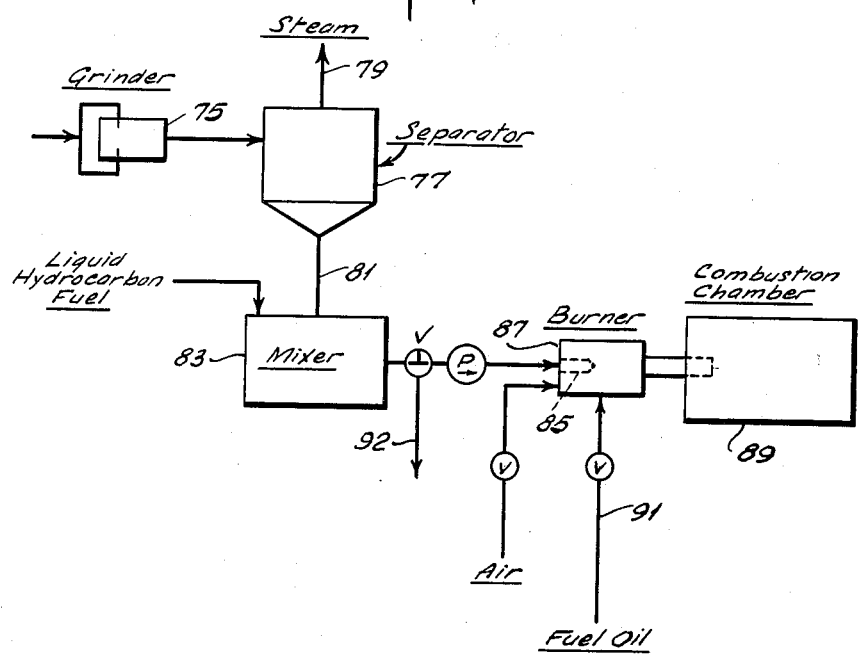

United States Patent Office 3,089,539
Patented May 14, 1963

3,089,539
METHOD AND FUEL FOR OPERATING COMBUSTION EQUIPMENT
Herbert E. Vermillion, Wappingers Falls, Charles C. Towne, Fishkill, and George W. Eckert, Glenham, N.Y., assignors to Texaco Inc., a corporation of Delaware
Filed June 27, 1955, Ser. No. 518,146
3 Claims. (Cl. 158—117.5)

The present invention relates to a novel method and fuel composition for operating combustion equipment, particularly such equipment as oil fired boilers and gas turbines. It also concerns a novel method for preparing the fuel composition.

Some fuel oils contain high contents of vanadium and nickel which are detrimental because they cause fluxing and damage to the refractory linings of combustion chambers, and corrosion of boiler tubes and the blades of gas turbines.

It has been found that the detrimental effects of vanadium and nickel can be counteracted by introducing into such a fuel oil a small quantity of fine particles of a solid substance characterized by the ability to counteract the damaging effect of the metal component of the oil. See General Electric Technical Information Series No. 52-TG-316. Among such counteractants are lime, dolomite, silica, iron oxide, alumina, magnesium oxide, and talc. Compounds which are changed by heat to produce the foregoing named ingredients also are considered their equivalents, for example silicic acid, aluminum hydroxide, and limestone.

While any small quantity of counteractant provides a beneficial effect, the best results are obtained when an amount is present which is at least equivalent in weight to the total ash content of the oil. Up to three times the amount of the ash content can be used successfully, but it is doubtful that any increase beyond this amount is economically justifiable, although completely operable. Particles of counteractant must be extremely fine if they are to operate successfully. It is particularly important that their size be such that a stable suspension of the solids in the fuel oil is obtained, so as to provide uniform dispersion in the fuel oil during its combustion. Particles having an average diameter less than 25 microns should generally be employed; but when the fuel is not to be burned immediately but is to be stored as a stable suspension for future use, particle sizes of less than 5 microns and even as low as .02–.04 micron are desirable.

Briefly, the method of the invention includes the steps of first forming a flowable mixture of relatively coarse particles of the solid counteractant in a vaporizable liquid, vaporizing the liquid and forming a flowing dispersion of the particles in the vapor, subjecting the particles in the dispersion to high velocity in excess of 25 feet per second (preferably in excess of 100 feet per second) and turbulence such that the size of the particles is greatly reduced, passing the particles of reduced size along with liquid fuel into a combustion zone, and burning the fuel in the combustion zone in association with the solid particles whereby the detrimental effect of the metal component of the fuel oil is counteracted.

There are several ways in which the foregoing method steps can be performed. For example, in the simplest type of operation the relatively coarse solid particles are mixed with the total fuel oil. However, this requires a large amount of heat energy since a great quantity of fuel oil must be vaporized to grind and suspend a relatively small quantity of solids. This can be overcome by mixing the relatively coarse solid particles in a relatively small proportion of liquid hydrocarbon, which may be either the fuel oil or another combustible hydrocarbon which is compatible therewith, and subsequently adding the resulting concentrated dispersion to the fuel oil.

Some fuel oils tend to crack when heated to temperatures such as are required for grinding and suspending solid materials. When such a fuel oil is to be treated by the invention, it is desirable to employ a refractory combustible liquid hydrocarbon such as kerosene as the grinding and suspending medium for the solid particles, and then to combine the resulting kerosene suspension subsequently with the fuel oil to form a homogeneous mixture which is burned in the combustion chamber.

Still another way for suspending solid particles in the fuel oil is to employ water as a suspending agent for the relatively coarse particles. After the resulting steam dispersion has been passed through the grinding system steam may be separated and the solid particles added to the fuel oil. Alternatively, the suspension of ground solid particles in steam may be injected directly into the combustion chamber along with the fuel oil, as by atomizing the fuel oil therewith.

In another embodiment, when the solid particles have been initially suspended in a liquid fuel such as the fuel oil or kerosene, the resulting vapor is condensed after the grinding operation to form a suspension of extremely fine solid particles in liquid fuel, which is then atomized and passed to the combustion chamber, either alone or mixed with additional fuel oil. Alternatively, this suspension may be passed into a storage vessel for subsequent use as a fuel; or it may be mixed with fuel oil and the resulting mixture stored for future use.

The principles of the invention will be described in detail below with reference to the accompanying drawings wherein.

FIG. 3 is a schematic flow diagram of a part of a modified form of apparatus wherein a convergent-divergent nozzle is employed, and a suspension of solid particles in vapor is passed directly to a combustion chamber; and FIG. 4 is a schematic flow diagram of a part of still another modified form of apparatus for performing the invention by employing water as the suspending medium, and separating steam from the solid particles before introducing them into a liquid fuel.

Figure 1:
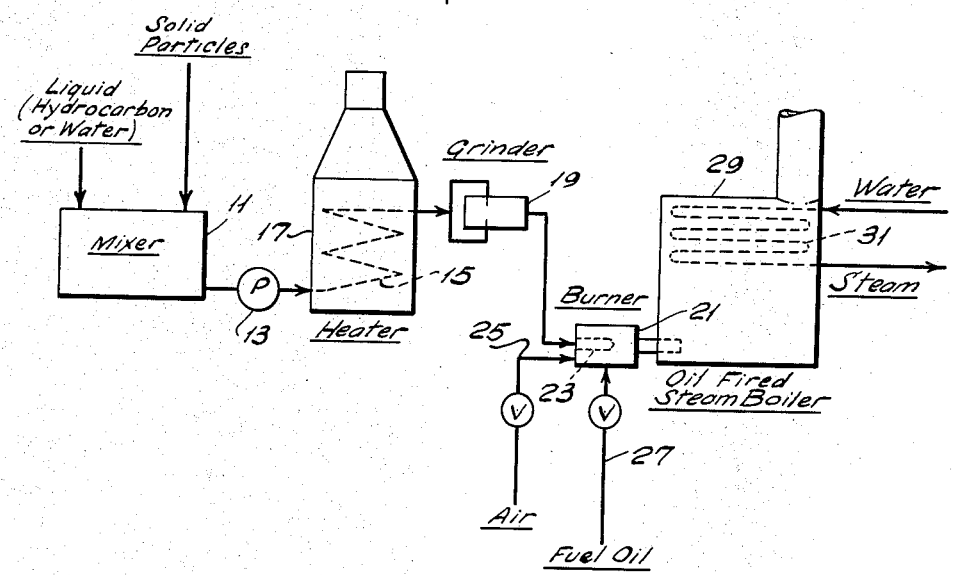
FIG. 1 is a schematic flow diagram showing apparatus for performing one embodiment of our invention, wherein a dispersion of solid particles in vapors is passed directly into a combustion chamber.

Referring to FIG. 1, relatively coarse solid particles of counteractant are mixed with a vaporizable liquid such as a liquid hydrocarbon or water in a mixer 11. To form a flowable slurry the mixture should contain at least 35% liquid by weight but considerably more liquid is generally employed. This slurry is passed by a pump 13 into a long tubular heating zone formed by a coiled pipe 15 within an oil fired heater 17. Alternatively, the tubular zone may be formed of straight pipe lengths connected by return bends, or even may be a long straight pipe.

In the heated pipe 15 part or all of the liquid is vaporized from the solid particles to form a flowing dispersion of solid particles in vapor, which is then passed to an opposed-nozzle fluid energy grinder 19 wherein at least two streams of dispersion impinge against one another at a large angle, such as 180°, to disintegrate the solid particles as the result of the impact produced by high velocity and turbulence.

The dispersion from grinder 19 flows to a burner 21 containing a nozzle 23. Air is introduced into the burner through a conduit 25 and, if necessary, fuel oil is introduced through a conduit 27. Such fuel oil is required only when the total fuel oil requirements have not been employed for making up the mixture in mixer 11, as when water or only a small proportion of kerosene or other hydrocarbon liquid have been employed. The resulting combustible mixture of vaporized or atomized fuel oil, together with air and solid particles, is discharged into a combustion chamber in an oil fired steam boiler 29 wherein its combustion heats the water passed through a tube 31.

*Example I*

700 parts per million (p.p.m.) of aluminum oxide having a particle size of 95% minus 100 mesh (U.S. Standard) and 70% minus 200 mesh are mixed with the total fuel oil in tank 11. The oil is a Venezuelan fuel oil having the following properties:

| | |
|---|---|
| Gravity, °API | 9.3 |
| Flash point (PM), °F. | 214 |
| Viscosity (Saybolt-Furol) at 122° F. | 140.6 |
| Carbon residue (Conradson) percent | 3.2 |
| Sulfur do | 2 |
| Total ash, p.p.m. | 700 |
| Vanadium p.p.m. | 400 |
| Nickel | trace |

The slurry is pumped into a ½ inch pipe coil, 400 feet long at a pressure of 475 pounds per square inch gauge (p.s.i.g.) and a rate of 800 pounds per hour, and heated to a maximum temperature of 750° F. so that a substantial portion of the fuel oil is vaporized. The resulting dispersion of solid particles in oil vapor passes through a pair of opposed nozzles having an orifice size of 5/32 inch in grinder 19. The dispersion leaving grinder 19 contains aluminum oxide particles which have been reduced in size so that they are 90% finer than 5 microns.

This dispersion passes into burner 21 at a pressure of 35 p.s.i.g. and is mixed with air from line 25 for combustion in the boiler 29.

*Example II*

Silica particles having a particle size of 71% minus 100 mesh and 52% minus 200 mesh are suspended in kerosene in the mixer 11 to form a slurry containing 40% of solid particles by weight. This slurry is pumped to coil 15 at a pressure of 600 p.s.i.g. and at a rate of 490 pounds per hour, and is heated therein to 750° F. The resulting dispersion, containing ground silica particles, 100% of which are finer than 5 microns, is evenly distributed at a pressure of 25 p.s.i.g. to a battery of seven burners 21 (70 pounds per burner), where it meets air from line 25 and Venezuelan fuel oil from line 27 flowing at a rate of 20,000 pounds per hour per burner so as to provide in the final combustible oil 1400 parts per million of silica.

Figure 2:
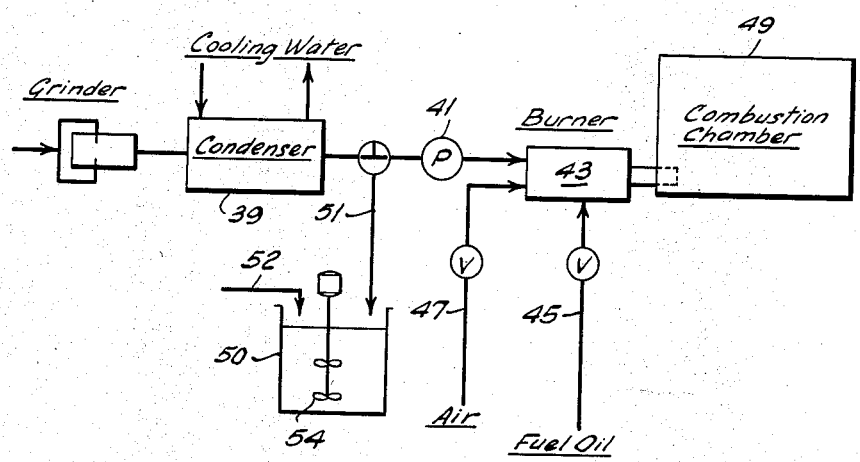
FIG. 2 is a schematic flow diagram of a part of a modified form of apparatus for operation by condensing a vaporous dispersion, and then passing the particle laden condensate to a combustion chamber; or alternatively, for withdrawing part or all of the condensate for storage.

Referring to FIG. 2, grinding is accomplished exactly as described in connection with FIG. 1, but instead of passing the dispersion of solid particles in vapor directly to a burner, this dispersion is condensed in a condenser 39 to reform a slurry containing particles of greatly reduced size in kerosene, fuel oil, or the like. The resulting slurry is pumped by a pump 41 into a burner 43 wherein it is atomized, either alone or along with fuel oil from a line 45, and air from a line 47, to form a combustible mixture which is passed into combustion chamber 49.

Slurry also may be withdrawn wholly or in part through a line 51 and run to a vessel 50 for subsequent use as a fuel. As a result of the extremely fine particle size of the solid particles they will remain substantially completely suspended in the liquid. Diluting fuel oil may be supplied by line 52, and thoroughly mixed with the kerosene or other slurry by a mixer 54. However, the slurry may also be kept undiluted and shipped elsewhere for subsequent dilution before use. This is especially advantageous where refractory kerosene has been used for the grinding and suspending operation, since the subsequent addition of the particle laden kerosene to fuel oil has no detrimental effect on the burning qualities of the oil.

*Example III*

600 p.p.m. of magnesium oxide having a particle size of 100% minus 100 mesh and 30% minus 325 mesh are mixed with the total requirement of a fuel oil and a dispersion is formed under the same operating conditions described in Example I. In this example, however, the fuel oil is a Bunker C fuel oil having the following characteristics:

| | |
|---|---|
| Gravity, °API | 9.1 |
| Viscosity, Saybolt-Furol at 122° F. | 150 |
| Pour point, °F. | 40 |
| Flash point, COC, °F. | 285 |
| Carbon residue, Conradson | 11.0 |
| Ash content, p.p.m. | 281 |
| Vanadium | 146 |
| Nickel | 84 |

The resulting dispersion of fuel oil containing fine magnesium oxide particles substantially all finer than 0.2 microns, is passed at atmospheric pressure into condenser 39 wherein it is fully reliquefied by indirect heat exchange with cooling water. 25% of the liquid fuel then passes to burner 43 wherein it is atomized in mixture with air from line 47, and burns in chamber 49.

The remaining 75% of fuel is withdrawn through line 51 for sale as merchantable fuel oil.

*Example IV*

Talc having a median particle size of 180 microns is mixed with kerosene in the proportions of Example II, and passed through the grinding system under the same conditions. The resulting dispersion in kerosene vapors of talc particles having a median fineness of 0.8 micron passes at atmospheric pressure to condenser 39 for reliquefication. 50% of the reformed suspension of talc particles in kerosene flows to a battery of burners 43 where it is mixed intimately with Venezuelan fuel oil supplied to line 45 and air from line 47 to form an atomized combustible mixture to heat the chamber 49. The remainder passes to tank 50 where it is intimately mixed with Venezuelan fuel oil and stored. Proportions are as in Example II.

With reference to FIG. 3 of the drawings, a suspension of solid particles in liquid, which has been made up as described above, is passed through a coiled tube 55 wherein a dispersion of solid particles in vapor is formed. This dispersion passes through a grinder 57 comprising a convergent-divergent nozzle wherein the velocity of the dispersion is increased to an extremely high value which is usually supersonic. As a result of the high velocity and turbulence, particles of solid material are disintegrated to an extremely fine size. The dispersion then flows to a burner 59 wherein it is mixed with air from line 61. If additional fuel oil is required, it is introduced through line 63. The resulting atomized combustible mixture enters chamber 65 for combustion, with the formation of great volumes of gaseous products which flow through a conduit 67 to a gas turbine 69 as operating fluid therefor.

*Example V*

A water slurry is made up containing 50% of iron oxide particles having a size of 100% minus 100 mesh, 70% minus 200 mesh, 40% minus 325 mesh. This slurry is pumped at a rate of 1000 pounds per hour and a pressure of 500 p.s.i.g. to a ½ inch heater coil 55, 600 feet long wherein the water is heated to a temperature of 850° F. to form a dispersion of iron oxide particles in steam. Dispersion then flows through grinder nozzle 57 at supersonic velocity so that the iron oxide particles are reduced to a size of 100% less than 5 microns and 95% less than 1 micron. Then the dispersion enters a battery of 10 burners 59 at a pressure of 30 p.s.i.g. In each burner dispersion passes through a nozzle 71 and aspirates air from line 61 and Venezuelan fuel oil from line 63 at a rate of 24,000 pounds per hour so as to provide an atomized combustible mixture wherein the iron oxide particles are present in an amount of about 2100 p.p.m. by weight based on the fuel oil. Upon combustion in the chamber 65 gases result which are passed to turbine 69 to operate the latter.

Referring to FIG. 4, grinding of the coarse solid particles so as to provide a stable suspension again is performed by vaporizing a water slurry of the solid particles to form a dispersion of solid particles in steam which passes through a grinder 75 of the opposed nozzle type. The resulting dispersion in steam of finely ground particles flows to a separator of the centrifugal cyclone type 77 from which steam passes off the top through line 79 while dry solid particles pass off the bottom through line 81 and enter a mixing tank 83. In tank 83 the solid particles are mixed intimately with a liquid hydrocarbon fuel which may be the total fuel oil, or a part of the fuel oil, or a different hydrocarbon such as kerosene which is compatible with the fuel oil. A stable suspension is formed which passes to nozzle 85 of burner 87 and thence with air into the combustion chamber 89. When additional fuel oil must be added, it is supplied through line 91.

Treated fuel may be withdrawn to storage through a conduit 92. This may be in the form of a concentrate, as in kerosene, which may be stored or shipped as such, later to be diluted with fuel oil in the proper proportions for combustion.

*Example VI*

Calcium oxide having a particle size of 100% minus 100 mesh, 65% minus 200 mesh is mixed with water to form a 50-50 mixture by weight which is heated as in Example V to form a dispersion, and passed to grinder 75 wherein the solid particles are reduced to a particle size of less than 5 microns. The dispersion then enters separator 77 at atmospheric pressure and the solid particles from the bottom of the separator pass into tank 83. In tank 83 the solid particles are mixed with the Bunker C fuel oil described in Example III. The fine powder from line 81 is mixed with the fuel oil in tank 83 in proportions of 600 p.p.m. to assure adequate inhibition of the harmful ingredients of the fuel oil.

The invention has been described above in several embodiments to illustrate the novel principles involved. However, it will be apparent to persons skilled in the art that still other modifications may be employed within the scope of the invention. For example, instead of using a slurry of solid particles in liquid, a flowable paste may be employed, and this paste may be picked up by a separately generated flowing stream of vapor such as steam or combustible hydrocarbon vapor to form the dispersion for grinding the solid particles. Also, where pressure operation cannot be employed with a fuel oil which cracks at the temperatures required, vacuum operation will reduce the operating temperatures.

Obviously, many modifications and variations of the invention, as hereinbefore set forth, may be made without departing from the spirit and scope thereof, and therefore only such limitations should be imposed as are indicated in the appended claims.

We claim:

1. A method for operating oil fired combustion equipment to reduce damage thereto normally caused by at least one metal component in said oil, said method comprising forming a flowable mixture in water of particles of a solid substance characterized by the ability to counteract the damaging effect of said metal component; passing said mixture as a flowing stream through a tubular zone; vaporizing said water as said mixture flows through said tubular zone and forming a flowing dispersion of said particles in steam therein; subjecting said particles in said flowing dispersion to high velocity and turbulence such that the size of said particles is reduced; passing said particles of reduced size along with oil into a combustion zone by atomizing said oil with said dispersion of solid particles in steam; and burning said oil in said combustion zone in association with said particles whereby the detrimental effect of said metal component is counteracted.

2. A method for operating fuel fired combustion equipment to reduce damage thereto normally caused by at least one metal component in said fuel, said method comprising forming a flowable mixture in a vaporizable liquid fuel of particles of a solid substance characterized by the ability to counteract the damaging effect of said metal component; passing said mixture as a flowing stream through a tubular zone; vaporizing said liquid fuel as said mixture flows through said tubular zone and forming a flowing dispersion of said particles in fuel vapor therein; subjecting said particles in said flowing dispersion to high velocity and turbulence such that the size of said particles is reduced; passing said flowing dispersion of solid particles in the vapor of said liquid fuel along with further fluid fuel into a combustion zone; and burning said vapor in said combustion zone in association with said particles and said further fluid fuel whereby the detrimental effect of said metal component is counteracted.

3. A method in accordance with claim 2, wherein said further fluid fuel is fuel oil.

References Cited in the file of this patent

UNITED STATES PATENTS

| | | |
|---|---|---|
| 2,613,737 | Schwietert | Oct. 14, 1952 |
| 2,735,787 | Eastman et al. | Feb. 21, 1956 |
| 2,763,434 | Strasser | Sept. 18, 1956 |
| 2,781,005 | Taylor et al. | Feb. 12, 1957 |

FOREIGN PATENTS

| | | |
|---|---|---|
| 705,176 | Great Britain | Mar. 10, 1954 |